Figure 1:
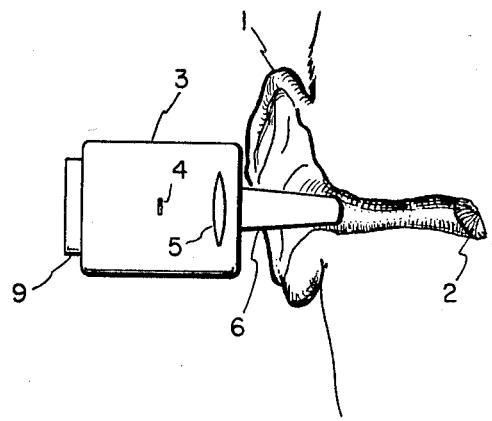

United States Patent Office 3,282,106
Patented Nov. 1, 1966

3,282,106
METHOD OF MEASURING BODY TEMPERATURE
Robert Bowling Barnes, Stamford, Conn., assignor to Barnes Engineering Company, Stamford, Conn., a corporation of Delaware
Filed Jan. 28, 1963, Ser. No. 254,156
6 Claims. (Cl. 73—355)

This invention relates to an improved method of measuring body temperature and more particularly to an improved method in which direct and intimate contact with the body tissues by the measuring instrument is not necessary.

The problem of measuring body temperature in warm blooded animals and particularly in humans is an important one as the body temperature is an indication of many physiological conditions including many illnesses. In the past body temperature has been taken by inserting a very sensitive clinical thermometer in a body cavity such as under the tongue or rectally. It takes considerable time, several minutes, to come to equilibrium, and the breakage problem with the clinical thermometers is a serious one, particularly in hospitals.

The present invention should not be confused with processes in which a different type of thermometer is brought in contact with body tissue, for example in U.S. Patent 3,054,397 and also in the more recently issued Patent No. 3,156,117 which describes a similar process and apparatus, it is proposed to insert a thermoelectric probe which may contain a thermocouple or a thermistor into the ear until it touches the tissues, for example the ear drum. This type of measurement does give instantaneous readings but still requires contact with the body tissues and is not practical for other than highly skilled professional use because of the danger of injury to the ear drum. It also creates considerable discomfort and even pain in most people.

The present invention utilizes radiation from certain portions of the body in order to measure temperature. As the body is at a temperature approximating 300° K. the radiation is, of course, in the infrared with a region of maximum radiation near 10μ.

Radiation from the body of humans or other mammals has been used with infrared cameras and other instruments to obtain thermographs or indications of radiation from particular points on the surface of the body. These uses have been extremely valuable but measurements obtained are purely relative because the temperature of the skin is influenced by environment. Thus, for example, radiation measurements of the temperature of the skin will be lower if the person is in a cold room than if he is in a warm room. Where relative indications are needed from different skin areas in the same environment this is no drawback. However, for the measurement of body temperature such radiation measurements are completely worthless.

The present invention uses infrared radiation but it uses the radiation from particular body portions namely portions of the body which are not exposed in a line of sight to the environment and which are sufficiently enclosed so that multiple reflections transform the cavity into a "black body." Under such circumstances the present invention has made possible an extremely accurate measurement of body temperature without requiring contact of the measuring element with tissues in a cavity as in the case of the ear drum measurements referred to above. There is, therefore, no danger of injuring the cavity by unskilled use and annoyance or discomfort on the part of the person whose temperature is being measured are entirely eliminated because there is no contact with the delicate and sensitive tissues inside the cavities. At the same time accuracy of the measurement compares favorably with that obtained on a good clinical thermometer and has the additional reliability that it is not necessary to wait to reach equilibrium as this occurs practically instantaneously in any radiation instrument. Another advantage of the present invention is that the radiations are detected and transformed into electrical signals which can be used to actuate a meter or a recorder or both.

When it comes to the choice of body cavity to use certain conditions limit the practical sites. At first glance it might seem that all that would be necessary would be to open the mouth slightly and measure the temperature by radiations from the tissue in the back of the mouth. This, however, is normally not practical because one of the requirements which have been stated above is not met, that is to say relative isolation from environmental conditions. Ordinarily in the case of the mouth in speaking or in the case of some people in breathing, lower temperature outside air is inhaled and exhaled and the temperature of this air will, therefore, affect the temperature of the tissues in the back of the mouth. The same considerations rule out the use of the nostrils. The most convenient cavity to use is the ear canal. The invention, however, is not limited thereto and any other cavity which fulfills the requirements of sufficient enclosure to produce the multiple reflections needed to cause the cavity to behave as a "black body" at the body temperature may be used. For example, with some persons it is possible to utilize the navel but with a majority this cavity is not sufficiently deep to provide the necessary multiple reflections and isolation from environmental factors required by the present invention. It might be thought that the inner canthus where the corner of the eye meets the nose might also be useful. This, however, is not always practical because the eye has so few blood vessels in comparison to its large content of liquid that it does not maintain itself at body temperature. Thus a portion of the surrounding tissues of the cavity are at a different temperature from that of the body as a whole and this renders measurement impractical unless a person first closes his eyes for a sufficiently long time, a matter of a number of minutes, so that the eye reaches body temperature. Rectal use is also possible but because of the greater convenience the use of the ear canal is preferred and constitutes the preferred modification of the present invention.

The present invention is a process because it is not necessary to use a new form of radiometer. All that is needed is a radiometer which receives radiation from a sufficiently narrow field so that it sees only the tissues in the rear portion of the body cavity. This does not necessarily require a new type of radiometer but it does require that the radiometer have a field of view sufficiently narrow so that it only sees the walls of the body cavity. Preferably for intermittent use the radiometer in the form of a small head having an infrared detector, preferably infrared focusing optics and shield from unwanted radiation which may be in the form of an internally polished truncated cone, is easiest to use and presents practical advantages. The invention, however, is not limited to the particular preferred type.

The high speed of measurement which is as fast as anyone can read a meter saves time in a doctor's office and also in hospital wards as the nurse can save the time needed for preparing clinical thermometers and using them with their relatively long time for reaching equilibrium. This is an important saving and the saving is obtained without the drawback of decreased accuracy. In fact the readings may be more accurate than with clinical thermometers if a nurse is pressed for time and there is an insufficient time of contact with the patient's tissues to reach an equilibrium. Also, errors due to failure to prepare the thermometer by shaking down or other procedures are completely avoided.

It has been stated above that one of the important advantages which characterize the present invention is that the temperature measuring elements do not contact delicate cavity tissues. The ear canal, however, is not quite straight unless the outer ear is pulled up slightly and so when used rapidly as in the case of taking temperatures of a number of patients in a hospital ward the end of the radiometer may light touch the outer ear. The temperature measuring elements, however, are operated by pure radiation and do not touch any tissue. The outer ear is not sensitive and a light touch of the end of a radiometer is neither uncomfortable nor painful. It is thus possible to take temperatures rapidly and often without waking up the patient as the light touch on the outer ear will frequently not wake up a sleeping patient particularly if he is expecting such a procedure. There is, therefore, obtained the additional advantage that the patient in a hospital is not disturbed to anything like the degree which is necessary when temperature is taken by thermometric means which have to contact body tissues for a sufficient time to reach equilibrium.

While for general use a portable radiometer is preferable and is the most versatile modification of the present invention, in the case of a hospital ward it is possible to effect a still greater saving in nurses' time. Modern infrared detectors, for example backed thermocouples and transistor preamplifiers, can be made so small that they can be incorporated in an ordinary ear plug of the type which is used with hearing aids. Here again there will be contact with the outer ear but the delicate tissues of the ear canal, the temperature of which is being measured only radiate and are not touched. Ear plugs can be wired so that a nurse can successively switch in the plugs for each patient from a central point and take the temperatures of a whole ward in a matter of two or three minues. Such a modification of the present invention is included and in large hospitals presents the maximum advantage of saving of nurses' time. The possibility of using the signals to operate recording means is particularly valuable as records of the patients' temperatures can be kept and do not require writing by the nurses. The fact that a radiometer does not necessarily have to be carried from person to person is, therefore, a desirable additional advantage of the present invention and the particular type and shape of radiometer used can be adapted to the conditions of use to produce optimum results.

Figure 2:
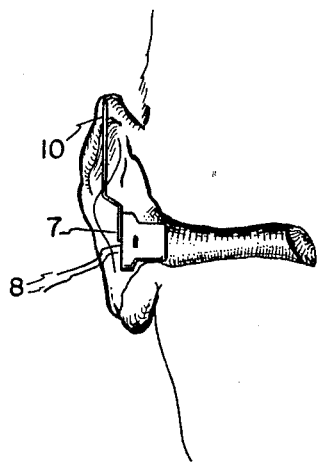

The invention will be described in greater detail in connection with the drawings in which:

FIG. 1 is an elevation, partly broken away, of a portable radiometer measuring the temperature of a patient's ear canal, and FIG. 2 is a similar elevation illustrating a radiometer head in the form of an ear plug.

Turning to FIG. 1 the outer ear of the person is shown at 1 with the ear canal 2 terminated by the ear drum. A portable radiometer with a housing 3, an infrared detector 4, such as a thermocouple or a thermistor, a focusing lens 5, for example of germanium or silicon, and an internally polished truncated cone 6 acting as a shield is shown aimed at the tissues of the ear canal. Temperature readings appear on the meter 9 which is conveniently mounted on the back of the radiometer though it can, of course, be separate from the head if desired.

In FIG. 1 the radiometer is shown purely diagrammatically without any special structural details as the radiometer can be a standard instrument except for its adjustment to view a sufficiently narrow field. As shown in FIG. 1 the radiometer does not actually touch any portion of the outer ear. Because of the fact that the ear canal is not quite straight this requires a considerable skill and is entirely unnecessary because the cone 6 may lightly touch portions of the outer ear without pain or discomfort.

In the radiometer shown in FIG. 1 the dimensions of the conical shade 6 and the adjustment of the optics are preferably shown to produce a very small field of view, for example at the distance of the ear canal an area 1/8" square or slightly larger, this assures that if the radiometer is not perfectly aimed it will not receive radiation from portions of the outer ear which, of course, are exposed to environmental conditions and do not give a true measure of body temperature. The invention, of course, is not limited to a radiometer adjusted for so tiny a field of view, although this is a commercially available instrument, and it is possible to use a radiometer with a somewhat broader field of view requiring, however, a more accurate aiming so that only the ear canal is seen.

There is another advantage of the present invention namely that it is not affected at all by moderate accumulations of ear wax. The ear wax is just as good a surface for measurement as there are enough multiple reflections though it may be slightly less black at $10\mu$ than is the skin of the ear canal itself. The fact, therefore, that it is not necessary that the measurement be from the wall of the ear canal itself is an added advantage. Needless to say in the ear canal any ear wax is at the body temperature.

FIG. 2 illustrates, again in diagrammatic form, a further modification. The ear and the radiation detector are given the same reference numerals as in FIG. 1. However, the detector is mounted in a conventionally shaped ear plug 7 from which wires extend to external circuits including indicating meters or recorders. The plug may also include a transistorized preamplifier which is of standard design and is, therefore, not shown. In the case of FIG. 2 where the ear plug is held into the ear either by its shape or by a suitable ear clip 10, it is not necessary to provide accurate focusing of the radiation and the detector may, therefore, receive radiation from a much wider field than is preferred in the radiometer shown in FIG. 1 where the truncated cone 6 does not necessarily have to be in contact with the outer edges of the ear canal. Further savings in radiometer head cost are thus made possible.

The wires 8 connect with suitable connectors on the patient's bed and the beds are connected by suitable cables to a central instrument which is provided with the necessary electronic circuits and meters or recorders together with switching means so that the ward nurse can switch in any patient at will. These electronic circuits are of standard design and are, therefore, not shown.

The present invention is aided by the fact that at $10\mu$ human skin is relatively black and, therefore, a smaller degree of cavity surrounding and hence multiple reflections will give black body results than if the skin were highly reflective.

What is claimed is:

1. A method of measuring body temperature of warm blooded animals which comprises aiming an infrared radiometer having radiation detecting means responsive to infrared for radiations from a 300° K. black body into a body cavity the surrounding tissues of which are isolated from environmental temperature changes and surround sufficiently to produce multiple reflections whereby the cavity, as a whole, radiates as a black body and reading temperature from the output of said radiometer.

2. A method according to claim 1 for the measurement of human body temperature in which the cavity is the ear canal.

3. A method according to claim 2 in which the radiometer is portable and has a narrow field of view so that radiation is received only from the tissues of the body cavity.

4. A method according to claim 2 in which the radiometer includes a separate radiometric head in the form of an ear plug which is attached to the outer ear in a position so that the radiometric head receives radiation from the surfaces of the ear canal.

5. A method according to claim 4 in which a plurality of radiometric heads are electronically connected to a central radiometer indicating station and the various heads are successively switched to contact with the radiometer indicating section so that the temperature of a number of persons can be measured successively from a central point.

6. A method according to claim 1 in which the radiometer is portable and has a narrow field of view so that radiation is received only from the tissues of the body cavity.

References Cited by the Examiner

UNITED STATES PATENTS

| 2,015,838 | 10/1935 | Bordon et al. | 73—341 |
| 2,279,043 | 4/1942 | Harrington | 73—341 |
| 2,813,203 | 11/1957 | Machler | 73—355 |
| 3,034,355 | 5/1962 | Butler | 73—355 |
| 3,036,464 | 5/1962 | Beeston | 73—342 |
| 3,156,117 | 11/1964 | Benzinger | 73—343 |

OTHER REFERENCES

Barnes, R. B.: Thermography of the Human Body . . ., in Science, volume 140, pages 870–877, May 24, 1963.

LOUIS R. PRINCE, *Primary Examiner.*

S. H. BAZERMAN, *Assistant Examiner.*